// United States Patent [15] 3,662,341
Baumgartner et al. [45] May 9, 1972

[54] VIDEO-DERIVED SEGMENTATION-GATING APPARATUS FOR OPTICAL CHARACTER RECOGNITION

[72] Inventors: Richard J. Baumgartner, Rochester, Minn.; Jeffrey L. Lovgren, San Antonio, Tex.; John W. McCullough, Rochester, Minn.

[73] Assignee: International Business Machines Corporation, Armonk, N.Y.

[22] Filed: Sept. 25, 1970

[21] Appl. No.: 75,513

[52] U.S. Cl. ............................340/146.3SQ, 340/146.3 AG
[51] Int. Cl. ..........................................................G06k 9/04
[58] Field of Search ...............................................340/146.3

[56] References Cited

UNITED STATES PATENTS

| | | | |
|---|---|---|---|
| 3,534,334 | 10/1970 | Bartz et al. | 340/146.3 AG |
| 3,526,876 | 9/1970 | Baumgartner et al. | 340/146.3 SG |
| 3,500,324 | 3/1970 | Gorbatenko et al. | 340/146.3 SG |

*Primary Examiner*—Thomas A. Robinson
*Assistant Examiner*—William W. Cochran
*Attorney*—Sughrue, Rothwell, Mion, Zinn & Macpeak

[57] ABSTRACT

A method and apparatus for gating segmentation scheme generators in accordance with a detected video signal. A video operator signal derived from detected video signals is compared with a threshold signal. One of a plurality of segmentation scheme generators is gated on in accordance with the comparison of the video operator signal and the threshold signal.

10 Claims, 8 Drawing Figures

INVENTORS
RICHARD J. BAUMGARTNER
JEFFREY L. LOVGREN
JOHN W. McCULLOUGH

BY Sughrue, Rothwell, Mion, Zinn & Macpeak
ATTORNEYS

VIDEO-DERIVED SEGMENTATION-GATING APPARATUS FOR OPTICAL CHARACTER RECOGNITION

CROSS-REFERENCE TO RELATED APPLICATIONS AND PUBLICATIONS

Application Ser. No. 504,457, filed Oct. 24, 1965 now U.S. Pat. No. 3,526,876 by Baumgartner et al., and assigned to the same assignee as the present invention.

Application Ser. No. 647,415 filed June 20, 1967 now U.S. Pat. No. 3,534,334 by Bartz et al., and assigned to the same assignee as the present invention.

Bartz, "The IBM 1975 Optical Page Reader, Part II," *IBM Journal of Research and Development*, September 1968, pp. 354–363.

BACKGROUND OF THE INVENTION

1. Field of the Invention

This invention relates to a video-derived segmentation-gating method and apparatus for optical character recognition, and more particularly, to a system which selects a segmentation scheme for determining where a character begins and ends in relation to its adjacent characters. The segmentation selected is optimum for the contrast of the characters being read.

2. Description of the Prior Art

In character recognition systems, a printed character to be recognized is transformed into some type of electrical signal or waveform which is then analyzed for the purpose of recognizing the unknown character. In a typical character recognition system, a cathode ray tube (CRT) flying spot scanner scans the characters on a document to be read. The beam of the CRT is reflected from the document to a photomultiplier tube. The output of the photomultiplier is an analog video signal which is amplified and digitized by appropriate circuitry and then entered into a shift register. The data in the shift register, therefore, represents the printed character on the document. The data in the shift register is then interpreted by character recognition circuitry to determine what the character is.

Since the scanning is continuous over the entire document, it is necessary to distinguish between adjacent characters or, in other words, where one character ends and the next character begins. This is done by means of segmentation schemes. A segmentation scheme is generated by logic circuitry which analyzes specific bits of data in the shift register, the result of the analysis being a determination that a character has or has not ended. If the analysis indicates that the character has ended, then a signal is generated which initiates the recognition circuitry of the system. Several segmentation schemes, including some of those used in conjunction with this invention, are set forth in application Ser. No. 504,457, filed Oct. 24, 1965 by Baumgartner et al., and assigned to the same assignee as the present invention.

Different segmentation schemes have what is referred to as varying degrees of segmentation power. Segmentation power can best be explained by way of an example. When low contrast or light character documents are vertically scanned, the line widths of a character tend to be narrow, and portions of the character are often separated by horizontal discontinuities. For this type of character, it is necessary to use a segmentation scheme which does not indicate the end of a character every time there is a blank space in the vertical scan.

On high contrast or dark character documents, however, there are very rarely horizontal discontinuities or spaces in the character. This type of character requires a segmentation scheme which indicates a character end at the first horizontal discontinuity. There are also segmentation schemes which are used when the contrast of the character is between high contrast and low contrast. Segmentation power is therefore related to the amount of space or discontinuity requirement for each segmentation scheme.

In the recognition circuitry of prior art systems a video operator or print contrast signal has been used to derive threshold levels for character recognition. It should be noted that character recognition as referred to herein means the recognition of a particular character after the bounds or ends of that character have been determined. It does not include the segmentation of the characters. This video operator is developed by prescanning the character to be recognized and averaging all the video samples greater than a predetermined minimum value. The value of the video operator is therefore indicative of the contrast between the document and the printed character. The development of the video operator is disclosed in application Ser. No. 647,415, filed June 20, 1967, by Bartz et al. and assigned to the same assignee as the present invention and is also disclosed in Bartz, "The IBM 1975 Optical Page Reader, Part II," *IBM Journal of Research and Development*, September 1968, pp. 354–363.

The prior art also discloses systems in which the character recognition circuitry is varied in accordance with other factors. For example, character recognition circuits have been varied in accordance with the age of the typewriter ribbon used to print the character.

SUMMARY OF THE INVENTION

The present invention combines these prior art teachings in a novel manner. It comprises an apparatus and method for segmentation scheme gating based upon the contrast of the printed character relative to the medium on which it is printed.

The video operator or print contrast signal is compared with a threshold signal representative of the difference between absolute black reference and the white of the document being read. This comparison signal is applied to logic circuitry which selects for each character a segmentation scheme of the proper segmentation power for determining the character end.

It is therefore the primary object of this invention to provide a method and apparatus that preserves the continuity of characters by switching between segmentation schemes of varying degrees of segmentation power.

It is another object of this invention to provide a method and apparatus for gating segmentation schemes based upon the contrast of the character being recognized.

It is a further object of this invention to use a video operator or print contrast signal, which is the average magnitude of all the video samples above a certain value, to select a segmentation scheme with the proper segmentation power for accurately determining the end of a character.

It is still a further object of this invention to provide means to prevent continuous changing from one segmentation to another after successive characters are scanned.

DESCRIPTION OF THE PREFERRED EMBODIMENTS

Figure 1:
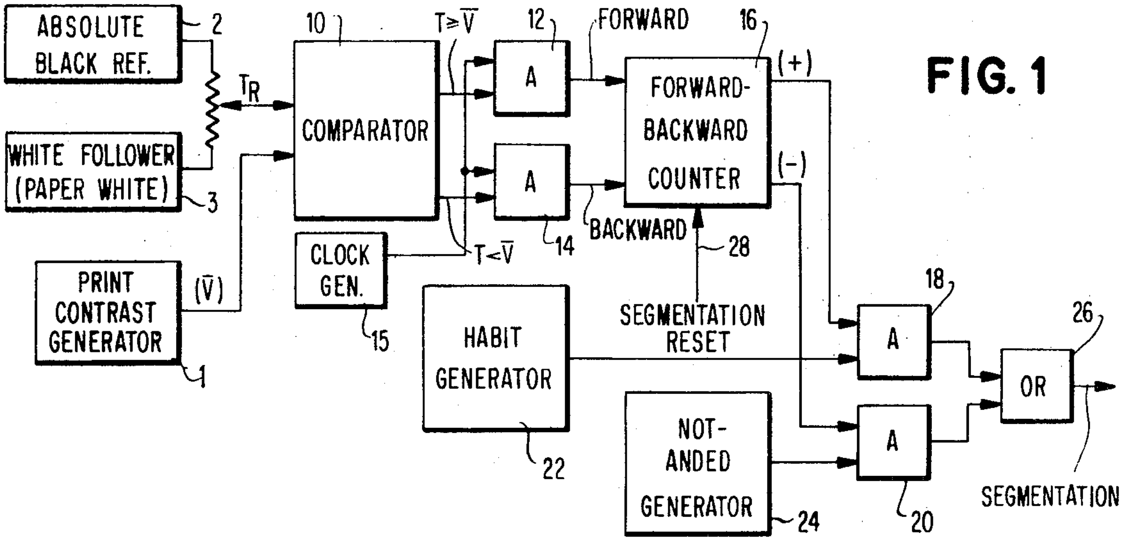
FIG. 1 is a block diagram of an embodiment of the present invention using two segmentation schemes.

FIG. 1 illustrates an embodiment of the invention using two segmentation schemes. A video operator or print contrast signal $\bar{V}$, generated by print contrast generator 1, and a reference threshold level signal $T_R$ are applied to a voltage comparator circuit 10. The threshold level $T_R$ is proportional to the difference between the signals from an absolute black video detector 2 and a white follower circuit 3.

The absolute black reference signal is a reference voltage which can be considered constant. It is equal to the signal generated by the detection of an image with 0 percent reflectance. The white follower is a minimum peak detector. Since the voltage level of white is lower than black, the white follower output is the minimum voltage level detected over a period of one or two character scans. $\bar{V}$ is the average of all the detected video samples within a predetermined area that are greater than some predetermined minimum value. The minimum value $T_{min}$ is defined as the threshold level below which video amplitudes have an extremely low probability of representing information. Therefore, V is defined by the equation:

$$\bar{V}=\frac{1}{N}\sum_{\substack{i=1\\ j=1}}^{\substack{i=m_x\\ j=m_y}} V(i,j) \text{ for } V(i,j) > T_{\min}$$

where $V(i,j)$ is the $j$th sample of the ith scan, $N$ is the total number of all video samples with $V(i,j) > T_{min}$ and $m_x$ and $m_y$ define the area over which $\bar{V}$ is evaluated.

The output of voltage comparator circuit 10 is applied to either AND gate 12 or 14, depending on whether $T_R$ is greater than $\bar{V}$ or $\bar{V}$ is greater than $T_R$. The other input to AND gates 12 and 14 is a clock pulse from a clock generator 15. The output of either AND gate 12 or 14 is then applied to forward-backward counter 16. The output of the forward-backward counter 16 is applied to either AND gate 18 or 20, depending upon whether the count in the counter is positive or negative. The other input to AND gate 18 or 20 is derived from the segmentation scheme generators, either HABIT generator 22 or NOT-ANDED generator 24. The output of AND gates 18 or 20 passes through OR gate 26. Forward-backward counter 16 has a reset input 28 which can be used to reset the counter. Typically, the reset is used where a new document is being read or where the operator re-reads a particular document or portion thereof.

In the operation of FIG. 1, voltage comparator circuit 10 compares the values of $\bar{V}$ and $T_R$. If $T_R$ is greater than (or equal to) $\bar{V}$, the output of voltage comparator 10 is applied to AND gate 12. If $\bar{V}$ is greater than $T_R$however, the output of the voltage comparator circuit 10 is applied to AND gate 14. The output of the voltage comparator circuit is gated through AND gate 12 or 14 by a clock pulse from clock generator 15. In this particular case, the clock pulses are from the 32nd stage of a 39 stage register. Digressing then, if $T_R$ is greater than (or equal to) $\bar{V}$, then a clock pulse is applied to AND gate 12. AND gate 12 then operates to step forward-backward counter 16 forward. If $\bar{V}$ is greater than $T_R$, however, AND gate 14 operates to step forward-backward counter 16 backward. Forward-backward counter 16 cumulatively counts the outputs of AND gates 12 and 14. If, after an output from either AND gate 12 or 14 is counted by forward-backward counter 16, the cumulative count is positive, (or equal to zero), then the output of forward-backward counter 16 is applied to AND gate 18. If, on the other hand, the cumulative count is negative, then the output of 16 is applied to AND gate 20. It can be seen, therefore, that the sign of the count in forward-backward counter 16 determines which segmentation scheme will be used to interpret the video data.

It should be noted that the forward-backward counter 16 is a cumulative counter. This prevents the switching of segmentation schemes for each change in the relationship of $T_R$ and $\bar{V}$ and therefore enhances, by the elimination of abrupt changes, the output of the optical reading system in which this device may be used. For example, if $T_R$ had been greater than $\bar{V}$ for three successive scans and, on the fourth scan, $\bar{V}$ is greater then be +2 and the output of forward-backward counter 16 would still operate AND gate 18 rather than switching to AND gate 20. It would take three more scans having $\bar{V}$ greater than $T_R$ before the sign (zero is taken as positive in most counter designs) of the output of forward-backward counter 16 would change, thereby changing the segmentation scheme from the HABIT generator to the NOT-ANDED generator. The embodiment described employs the scan as one counting interval, i.e., the value stored in counter 16 may be changed only once per scan. It is also possible to utilize other counting intervals, such as a complete character or a single bit of each scan.

Figure 2:
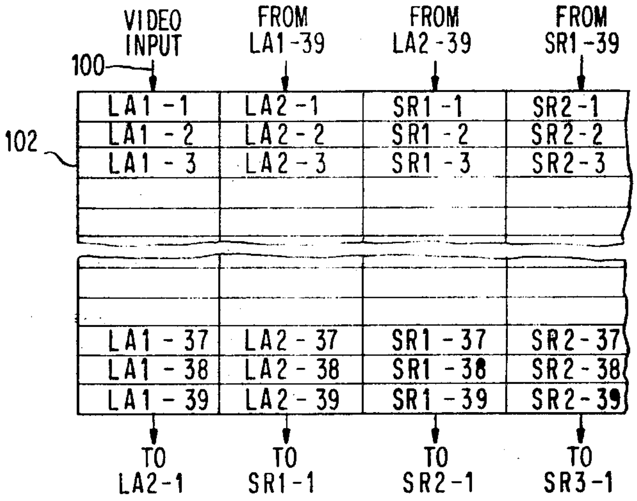
FIG. 2 is a diagrammatic representation of a typical shift register used with the present invention.

FIG. 2 is a typical shift register used in an optical scanning system. Video input 100 is derived from a video detector (not shown). The data is shifted into the first column LA1 until 39 bits have been shifted in, then the data starts shifting into the second column LA2 by shifting from LA1–39 to LA2–1. When data has shifted down the second column it starts into the third column, etc. The shift register 102 is therefore a long shift register drawn in a columnar configuration which corresponds to the scans of the video detector.

Figure 3A:
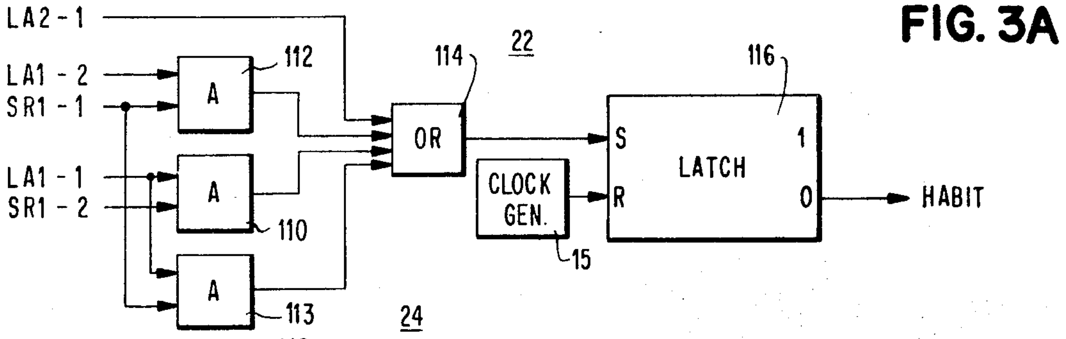
FIG. 3A is a block diagram of a HABIT segmentation scheme generator.
Figure 3B:
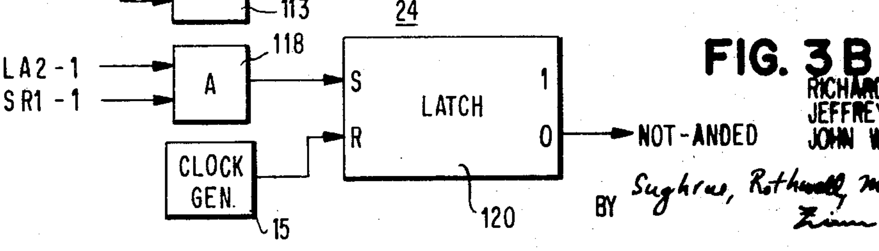
FIG. 3B is a block diagram of a NOT-ANDED segmentation scheme generator.

FIGS. 3A and 3B show the HABIT and NOT-ANDED segmentation scheme generators 22 and 24, respectively. In FIG. 3A, the inputs of HABIT generator 22 are from shift register 102. LA1–1 and SR1–2 are applied to AND gate 110, LA1–2 and SR1–1 are applied to AND gate 112, SR1–1 and LA1–1 are applied to AND gate 113, and LA2–1 is applied directly to OR gate 114. The outputs of AND gates 113, 110 and 112 also are applied to OR gate 114. The output of OR gate 114 is applied to latch 116 which is reset once per scan upon receipt of a clock pulse from the clock generator 15. The output of latch 116 is applied to AND gate 18 of FIG. 1.

In FIG. 3B, the inputs of NOT-ANDED generator 24 are also form shift register 102. LA2–1 and SR1–1 are applied to AND gate 118, the output of which is applied to latch 120. Latch 120 is also operated by a clock pulse from the clock generator. The output of latch 120 is applied to AND gate 20 of FIG. 1.

In the operation of FIG. 3A, as the video data is shifted into shift register 102 at input 100 in FIG. 2, the data in stages LA2–1, LA1–2, SR1–1, LA1–1, and SR1–2 are applied to HABIT generator 22. If though one vertical scan there is black or binary 1 in stage LA2–1 then the output of OR gate 114 operates latch 116 indicating that the character has not ended. If through one vertical scan there is black or binary 1 in positions LA1–2 and SR1–1 of shift register 102, then AND gate 112 operates, its output applied to OR gate 114, and OR gate 114 operates latch 116 indicating that the character has not ended. Also, if through one vertical scan there is black or binary 1 in stages LA1–1 and SR1–2, AND gate 110 operates, thereby operating OR gate 114. AND gate 113 similarly operates OR gate 114 for black in positions LA1–1 and SR1–1. OR gate 114 operates latch 116 indicating that a character has not ended. The HABIT generator, therefore, gives an end of character indication only if there is one completely blank scan and if corresponding bits on opposite sides of the scan are not both black. Corresponding bits are those which are directly horizontally opposite each other, and those which are opposite but up or down by one bit position.

The NOT-ANDED generator of FIG. 3B operates similar to the HABIT generator of FIG. 3A except that the requirement of the NOT-ANDED segmentation scheme is that a vertical scan anded with its horizontally adjacent scan be binary 0 for one complete scan. If this is the case, then a signal indicative of the end of the character is generated.

Figures 4, 5A, 5B, 5C:
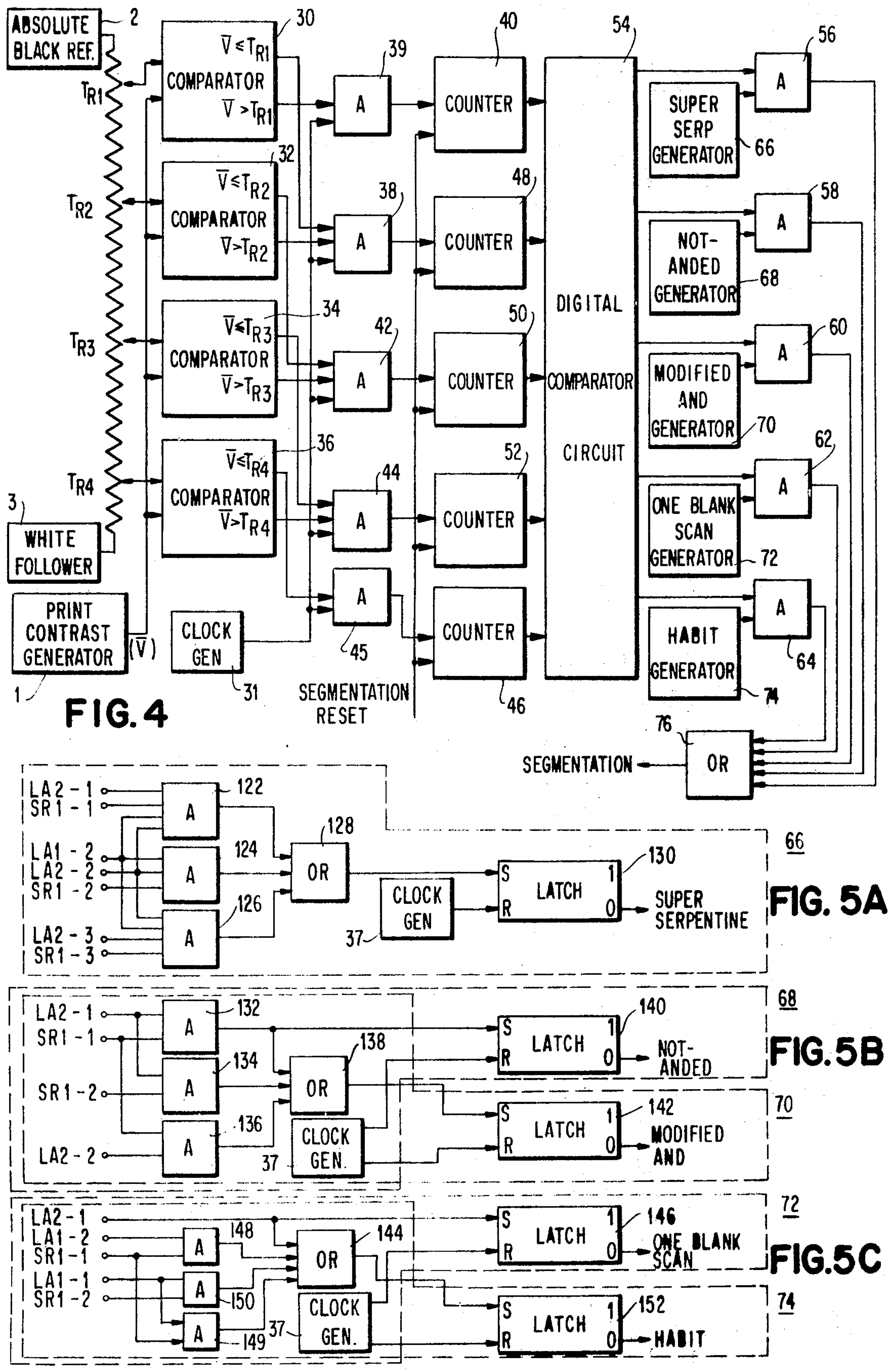
FIG. 4 is a block diagram of an embodiment of this invention using more than two segmentation schemes.
FIG. 5A is a block diagram of a SUPER SERPENTINE segmentation scheme generator.
FIG. 5B is a block diagram of a NOT-ANDED and MODIFIED AND segmentation scheme generator.
FIG. 5C is a block diagram of a ONE BLANK SCAN and HABIT segmentation scheme generator.

FIG. 4 shows an embodiment of this invention which uses five segmentation scheme generators. They are SUPER SERPENTINE, NOT-ANDED, MODIFIED ANDED, ONE BLANK SCAN, and HABIT. SUPER SERPENTINE is used for high contrast (dark print), HABIT is used for low contrast (light print) and NOT-ANDED, MODIFIED ANDED, and ONE BLANK SCAN are used respectively for the contrasts inbetween. That is, the greater the print contrast, the more powerful is the segmentation scheme; conversely, the less powerful segmentation algorithms are used for lighter contrast values. Four reference threshold signals $T_{R1}$ through $T_{R4}$ are applied to comparator circuits 30, 32, 34, and 36 where the threshold signals are compared with the video operator $\overline{V}$. The outputs of comparator 30 are applied to AND gates 38 and 39, respectively. The outputs of comparator circuit 32 are applied to AND gate 42 and AND gate 38, respectively. The outputs of comparator circuit 34 are applied to AND gate 44 and AND gate 42, respectively, and the output of comparator circuit 36 is applied to AND gates 45 and 44, respectively. The output of AND gate 39 is applied to counter 40, the output of AND gate 38 is applied to counter 48, the output of AND gate 42 is applied to counter 50, the output of AND gate 44 is applied to counter 52, and the output of AND gate 45 is applied to counter 46. AND gates 38, 39, 42, 44 and 45 also have timing signal inputs from clock generator 37. The output of counters 40, 48, 50, 52, and 46 are applied to digital comparator circuit 54 and the outputs of circuit 54 are applied to AND gates 56, 58, 60, 62, and 64, respectively. The other inputs to these AND gates are the segmentation scheme generators, such that SUPER SERPENTINE generator 66 is applied to AND gate 56, NOT-ANDED generator 68 is applied to AND gate 58, MODIFIED AND generator 70 is applied to AND gate 60, ONE BLANK SCAN generator 72 is applied to AND gate 62, and HABIT generator 74 is applied to AND gate 64. The outputs of the AND gates are applied to OR gate 76, the output of which is the segmentation scheme to be used in interpreting the video data.

In the operation of the embodiment of FIG. 4, the video operator $\overline{V}$ for each character is compared with four threshold values $T_{R1}$ through $T_{R4}$, the comparison being made with $T_{R1}$ in comparator 30, $T_{R2}$ in comparator 32, $T_{R3}$ in comparator 34, and $T_{R4}$ in comparator 36. The outputs of the comparator circuits are arranged with AND gates 38, 39, 42, 44, and 45 and counters 40, 48, and 50, 52, and 46 in such a manner that if $\overline{V}$ is greater than $T_{R1}$, counter 40 advances one count; if $\overline{V}$ is between $T_{R1}$ and $T_{R2}$, counter 48 advances one count; if $\overline{V}$ is between $T_{R3}$ and $T_{R4}$, counter 52 advances one count; and if $\overline{V}$ is less than $T_{R4}$, counter 46 advances one count. As in the embodiment of FIG. 1, the count in these counters is cumulative. After each count, digital comparator circuit 54 looks at the counts in counters 40, 48, 50, 52, and 46, and selects the counter with he largest value. The counter with the largest value determines which of the outputs of digital comparator 54 will be activated. In case of exact equality between any two adjacent counters, the AND gate for the less powerful segmentation technique is enabled. The output of digital comparator 54, through AND gates 56, 58, 60, 62, and 64, gates one of the segmentation scheme generators 66, 68, 70, 72 or 74. As discussed in relation to FIG. 1, the use of counters prevents the switching of segmentation schemes for each different $\overline{V}$ detected and thereby provides an output with a continuity of characters.

FIGS. 5A, 5B and 5C show the five segmentation scheme generators used in the embodiment of FIG. 4. All of the inputs to the generators are derived from shift register 102 of FIG. 2.

FIG. 5A shows the SUPER SERPENTINE generator. LA2–1, SR1–1, LA1–2, and LA2–2 are all applied to AND gate 122. LA1–2, LA2–2, and SR1–2 are all applied to AND gate 124. LA1–2, LA2–2, LA2–3, and SR1–3 are all applied to AND gate 126. The outputs of AND gates 122, 124 and 126 are applied to OR gate 128, the output of which is applied to latch 130. Latch 130 also receives a timing input from clock generator 37.

FIG. 5B shows the NOT-ANDED and MODIFIED AND segmentation scheme generators. LA2–1 and SR1–1 are applied to AND gate 132. LA2–1 and SR1–2 are applied to AND gate 134. SR1–1 LA2–2 are applied to AND gate 136. The output of AND gate 132 is applied to OR gate 138 and latch 140. The outputs of AND gates 134 and 136 also are applied to OR gate 138. The output of OR gate 138 is applied to latch 142.

FIG. 5C shows the ONE BLANK SCAN and HABIT segmentation scheme generators. LA2–1 is applied to OR gate 144 and latch 146. LA1–2 and SR1–1 are applied to AND gate 148, LA1–1 and SR1–1 are applied to AND gate 149, and LA1–1 and SR1–2 are applied to AND gate 150. The outputs of AND gates 148, 149 and 150 also are applied to OR gate 144, the output of which is applied to latch 152. The latches 146 and 152 receive timing inputs from clock generator 37.

The operation of the segmentation scheme generators in FIGS. 5A, 5B and 5C is similar to the operation of the segmentation scheme generators of FIGS. 3A and 3B as set forth above.

While the invention has been particularly shown and described with reference to preferred embodiments thereof, it will be understood by those skilled in the art that various changes in form and details may be made therein without departing from the spirit and scope of the invention.

We claim:

1. In an optical character recognition system for identifying printed characters on a document, a video derived segmentation gating system comprising:

a. means for generating a print contrast signal indicative of the average contrast of each of said characters;
b. means for generating a threshold signal;
c. comparator means responsive to said print contrast and said threshold signals for generating for each character a first comparison signal when said threshold signal is greater than said print contrast signal and a second comparison signal when said print contrast signal is greater than said threshold signal;
d. a plurality of segmentation scheme generator means of varying segmentation power for generating segmentation schemes said segmentation schemes detecting the end of each character to be identified; and
e. gate means responsive to said first or second comparison signal for gating the particular one of said segmentation scheme generator means which provide the most appropriate segmentation power for the character to be identified.

2. The system of claim 1 wherein said means for generating a threshold signal comprises:

a. an absolute black reference signal generator means for generating an absolute black reference signal;
b. a white follower signal generator means for generating a signal indicative of the lightest color of the document; and
c. output means for generating said threshold signal proportional to the difference between said absolute black reference signal and said white follower signal.

3. The system of claim 1 wherein said gate means comprises:

a. counter means for cumulatively counting, for prior counting intervals and for a current counting interval, the number of occurrences of first comparison signals and of second comparison signals, said counter means for generating for each interval an output signal which is representative of the difference between the number of occurrences of said first comparison signals and said second comparison signals; and
b. means responsive to the output signal of said counter means for gating said particular one of said segmentation scheme generators.

4. The system in claim 3 wherein said counter means comprises a forward-backward counter which steps forward for each of said first comparison signals and steps backward for each of said second comparison signals.

5. The system of claim 1 wherein:

a. said means for generating a threshold signal further comprises means for generating a plurality of threshold signals;

b. said comparator means comprises a plurality of comparators each comparing said print contrast signal and a different one of said threshold signals such that each comparator generates one of said first or said second comparison signals; and
c. said gate means further comprises means responsive to particular combinations of all of said first and second comparison signals for gating the particular one of said segmentation scheme generator means which provides the most appropriate segmentation power for the character to be identified.

6. The system of claim 5 wherein said gate means comprises:
a. a plurality of AND gates each responsive to a different combination of said first and said second comparison signals;
b. a plurality of counters each of which is coupled to the output of a different one of said AND gates, whereby each of said counters cumulatively counts for prior counting intervals and for a current counting interval the number of occurrences of an output of its associated AND gate; and
c. digital comparator means, responsive to the cumulative count of each of said counters, for gating a segmentation scheme generator means corresponding to the counter having the highest count.

7. A method for gating a video segmentation scheme, in an optical character recognition system for identifying printed characters on a document, comprising the steps of:
a. generating a print contrast signal indicative of the average contrast of each of said characters;
b. generating a threshold signal;
c. comparing said print contrast signal and said threshold signal and producing a first comparison signal if said threshold signal is greater than said contrast signal and a second comparison signal if said contrast signal is greater than said threshold signal;
d. generating a plurality of segmentation schemes with varying degrees of segmentation power for detecting the end of each character to be recognized; and
e. gating on one of said plurality of segmentation schemes in accordance with the existence of said first or said second comparison signal whereby the proper segmentation scheme for identifying the end of a character is selected.

8. The method of claim 7 wherein the step of using said comparison signals to gate a particular one of said segmentation schemes includes applying said first or said second comparison signal to a cumulative count of prior said comparison signals and generating a gating signal in accordance with the new cumulative count.

9. The method of claim 7 wherein:
a. said step of generating a threshold signal further comprises generating a plurality of threshold signals;
b. said step of comparing said print contrast signal and said threshold signal further comprises comparing said print contrast signal with each threshold signal such that a separate said first or said second comparison signal is generated for each comparison; and
c. said step of using said first and said second comparison signals further comprises using particular combinations of all of said first and said second comparison signals for gating a particular one of said segmentation scheme generators.

10. The method of claim 9 wherein said step of gating on one of said plurality of segmentation schemes comprises:
a. applying particular combinations of said first and second comparison signals to a plurality of AND gates;
b. separately counting for prior counting intervals and for a current counting interval the occurrences of the outputs of each of said AND gates in a plurality of counters, each of said counters associated with a particular said AND gate;
c. gating on a particular one of said segmentation scheme generator means in accordance with the counter having the highest count.

* * * * *